Jan. 5, 1965 A. U. SHARON 3,164,673

AUTOMATIC BRIGHTNESS AND CONTRAST CONTROL CIRCUIT

Filed Dec. 5, 1961

INVENTOR:
AL U. SHARON,
BY Joseph Levinson
HIS ATTORNEY.

United States Patent Office 3,164,673

Patented Jan. 5, 1965

3,164,673

AUTOMATIC BRIGHTNESS AND CONTRAST CONTROL CIRCUIT

Al U. Sharon, Liverpool, N.Y., assignor to General Electric Company, a corporation of New York Filed Dec. 5, 1961, Ser. No. 157,114
4 Claims. (Cl. 178—7.5)

Figure 1:
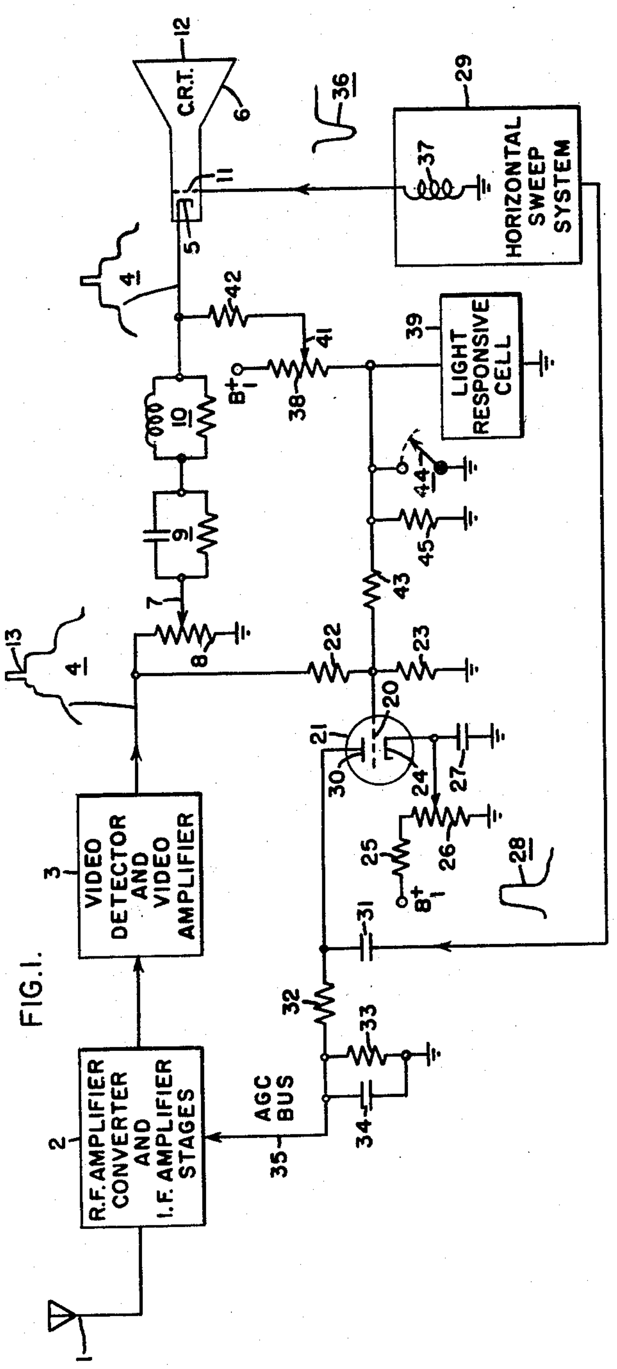

This invention relates to a means for automatically altering the brightness and contrast of a reproduced image in a television receiver responsive to variations in the intensity of the light level striking the face of a picture tube. More particularly, the invention relates to an improvement in a circuit, including a light responsive element, which provides a control voltage for controlling these changes.

A circuit for automatically controlling image contrast and brightness in a television receiver is described in copending application, Serial No. 104,909, filed April 24, 1961, which is assigned to the assignee of this invention. It is therein disclosed that an automatic control voltage for altering contrast and brightness is derived from a circuit which includes an element having an electrical characteristic which varies with the intensity of light striking the element. Contrast is automatically varied by coupling the control voltage to an automatic gain control circuit in the television receiver in order to vary a preselected and regulated video signal level at an input electrode of the picture tube. The control voltage is also coupled to an electrode of the picture tube for simultaneously varying image brightness.

In the aforementioned circuit, the preselected and regulated video signal level at an input electrode of the picture tube is varied by changing the cathode voltage and therefore the bias on an amplifying device in the automatic gain control circuit of the receiver. Although this system operates satisfactorily, the system necessitates the use of relatively low impedances in the circuit which provides the control voltage. The light responsive element is consequently subjected to relatively high power dissipation which tends to vary the characteristics of the element and to shorten its useful life. Although light responsive elements with larger power ratings may be utilized to overcome this difficulty, such an alternative is undesirable, especially where cost of the receiver is of primary importance since elements of higher power are more expensive than elements of lower power ratings.

It is accordingly, an object of this invention to provide an improved circuit for providing automatic contrast and brightness control in a television receiver.

It is another object of this invention to provide an automatic brightness and contrast control circuit in which variations in the characteristic of a light responsive element due to power dissipation and age are substantially reduced.

In an embodiment of the aforementioned brightness and contrast control circuit disclosed in the copending application, brightness is varied by coupling the control voltage to the first anode of the picture tube. Such a connection provides satisfactory variations in image brightness only with a picture tube having a high trans-conductance. Furthermore, since the first anode is a component of the electron lens, some slight but undesirable defocusing of the electron beam occurs.

Another object of this invention is to provide an automatic contrast and brightness control circuit which eliminates defocusing of the picture image and allows operation with conventional picture tubes having present day design values of transconductance.

In accordance with this invention, a television receiver having a picture tube with a viewing face and an automatic gain control circuit for regulating a preselected video level at an input electrode of the picture tube is provided with an element having an electrical characteristic which varies with the intensity of the light striking it. The element is positioned relative to the receiver so as to be struck by light of substantially the same intensity as that which strikes the face of the picture tube. The element is connected to a control circuit for providing a control voltage which varies in amplitude with the light intensity. The control voltage provided is of a polarity suitable for connection both to a cathode of the picture tube for controlling brightness and to control electrode of an amplifying device in the automatic gain control circuit for controlling contrast. Impedance means are connected to the element for reducing variations in control voltage due to undesirable changes in the lumen-resistance characteristic of the element.

Figure 3:
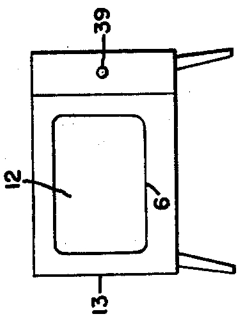
Figure 2:
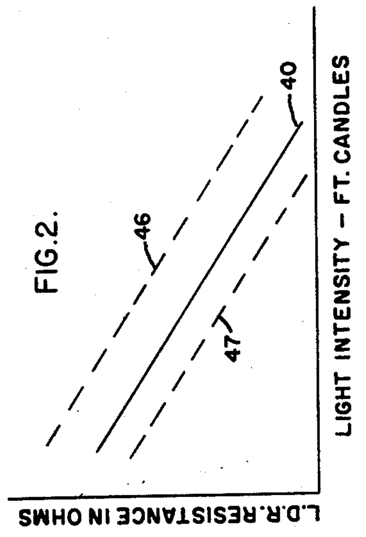

Further object, features and attending advantages of this invention will be apparent with reference to the following specification and drawings in which:

FIGURE 1 is a diagram, partly in schematic and partly in block form, of a television receiver embodying the improved automatic contrast and brightness control circuit of this invention, FIGURE 2 is a diagram illustrating the light intensity resistance characteristic of the light responsive element utilized in the invention, and FIGURE 3 is a front view of a television receiver cabinet illustrating the relative positions of the viewing face of the picture tube and the light responsive element.

Referring now to FIGURE 1, a television receiver is illustrated wherein a transmitted television signal received by an antenna 1 and coupled successively to conventional RF tuner, amplifier, converter, and IF amplifier stages represented by block 2 and to conventional video detector and amplifier stages represented by block 3. An amplified composite video waveform 4 is derived from the anode circuit, not shown, of a video amplifier included in block 3 and is coupled to the cathode electrode 5 of a cathode ray picture tube 6 via a sliding arm 7 of a manual contrast control potentiometer 8, a coupling circuit 9 and a peaking circuit 10. Although waveform 4 is shown coupled to the cathode electrode 5, it could when proper polarities are observed, be coupled to another input electrode of the picture tube such as a control electrode 11. Either the cathode 5 or the control electrode 11 represent input electrodes of the picture tube for the video input signal. The video input signal modulates an electron beam within the picture tube for reproducing an image on a viewing face 12 of the picture tube.

The amplified video signal 4 is also direct current coupled to an input control electrode 20 of a keyed automatic gain control amplifying triode 21 via a voltage divider network comprising a pair of resistors 22 and 23. A cathode 24 of the keyer triode 21 is biased at a positive potential by a voltage divider comprising a resistor 25 and a potentiometer 26 which are interconnected between a source of positive potential, $B_1+$, and ground. The cathode 24 is bypassed to ground by a capacitor 27. Since the control electrode 20 is D.C. coupled to the anode circuit of the video amplifier, a D.C. potential exists at control electrode 20 and a D.C. control electrode to cathode bias voltage is therefore provided for the keyer tube 21. This bias voltage can be manually varied by adjusting the arm of potentiometer 26.

Anode energy in the form of positive voltage pulses 28 is derived from the horizontal sweep system 29 of the television receiver and is coupled to an anode 30 of the triode 21 via a capacitor 31. A filter circuit comprising resistors 32 and 33 and capacitor 34 is also connected to the anode 30. An automatic gain control bias is developed at the junction of filter elements 32, 33 and 34. This automatic gain control bias voltage is connected to RF and IF stages in the receiver via an AGC bus 35 for controlling the gain of these stages.

The aforementioned AGC bias voltage is developed in a manner well known upon coincidence of a synchronizing component 13 of the composite video signal 4 and a pulse 28 at the control electrode 20 and anode 21, respectively. This biased voltage regulates an initially preselected video signal level and an input electrode of the picture tube. The regulating action maintains the video signal level substantially constant when variations in the intensity of the received input signal occur. The bias on the keyer tube 21 establishes this level. Potentiometer 26 is provided for manually adjusting the level. A circuit, described hereinafter, is provided to automatically vary the bias responsive to changes in the intensity of the light striking the face of the picture tube.

The sweep system 29 also provides negative blanking pulses 36 for the picture tube which may be derived from a winding 37 on a horizontal output transformer. The pulses 36 are coupled from the winding 37 to the control electrode 11 of the picture tube 6. The winding 37 is shown having one end connected to ground potential and established a D.C. potential in the control electrode 11.

In accordance with this invention, an impedance, a light responsive element, and a source of potential are arranged for providing a positive going automatic control voltage when the intensity of light striking the face of the picture tube decreases and a negative going voltage when the light intensity increases. The automatic control voltage is connected to the cathode of the picture tube for varying brightness and to control electrode of the AGC amplifying device for varying contrast. A potentiometer 38 and a photo-conductive cell 39 are serially connected to a voltage source $B_1+$ for providing this control voltage. The cell 39 may be a cadmium-sulphide photo-conductive cell having a light intensity-resistance characteristic as illustrated by the solid line curve 40 of FIGURE 2, or any other type device having a similar characteristic.

Since the resistance of cell 39 varies with light intensity as illustrated in the curve of FIGURE 2, the voltage along potentiometer 38 and at the junction of the potentiometer 38 and cell 39 will vary in accordance with changes in the light intensity which strikes the cell. The cell 39 is positioned to be struck by light of the same intensity which strikes the face of the picture tube. FIGURE 3 illustrates one manner in which the cell 39 may be positioned relative to the viewing face 12 of the picture tube 6 on a television receiver cabinet 13 for being struck by light of the same intensity which strikes the viewing face.

The control voltage is connected from a point on the potentiometer 38 via a sliding arm 41 and a current limiting resistor 42 to the cathode 5 of the picture tube 6 for automatically varying brightness. The potentiometer 38 also serves as a manual brightness control for establishing a desired level of picture tube brightness. A control voltage is also coupled to the control electrode 20 of keyer tube 21 via a resistor 43 for varying picture contrast. Because the control voltage is connected to the control electrode 20, the impedance at potentiometer 38 may be relatively high thereby permitting a relatively low cell current and corresponding reduction in cell power dissipation. A switch 44 is also provided and is connected in parallel with the cell 39 for eliminating automatic contrast and brightness control when so desired.

Referring again to FIGURE 2, two additional light intensity-resistance characteristic curves 46 and 47, are shown and represent changes from the initial desired characteristic curve 40. Although the impedance of potentiometer 38 is selected to have a high enough value so as to substantially reduce such changes due to excessive power dissipation, the characteristic curve 40 may vary in the direction of curves 46 or 47 due to ambient operating conditions, to age, or to initial differences between individual cells.

In accordance with another feature of this invention, a loading resistor 45 is provided and is connected in parallel with the cell 39 in order to minimize the effect of the above mentioned changes in cell resistance-lumen characteristic upon the control voltage. The loading resistor conducts a current from B+ via potentiometer 38 to ground potential and thereby minimizes changes in the control voltage. Voltage changes occurring across the photo cell 39, although reduced by the loading of resistor 45, are still of sufficient amplitude to provide the desired operation.

While it will be understood that the value of circuit components for the automatic contrast and brightness control circuit of this invention may vary in order to satisfy individual requirements, the following circuit parameters have been found to provide satisfactory operation and are included herein only by way of example.

| | |
|---|---|
| Cathode ray picture tube **6** | 23NP4. |
| AGC amplifying device **21** | ½ 6AW8. |
| Light responsive cell **39** | Clariex photo cell CL 505. |
| R8 | 25K. |
| R22 | 68K. |
| R23 | 6.8K. |
| R25 | 190K. |
| R26 | 40K. |
| R38 | 100K. |
| R42 | 120K. |
| R43 | 47K. |
| R45 | 100K. |
| C27 | .01 $\mu$f. |
| $B_1+$ | +278 volts D.C. |
| $B_2+$ | +135 volts D.C. |

While I have illustrated and described and pointed out in the annexed claims certain novel features of my invention, it will be understood that various omissions, substitutions, and changes in the forms and details of the system illustrated may be made by those skilled in the art without departing from the spirit of the invention and the scope of the claims.

What I claim as new and desire to secure by Letters Patent of the United States is:

1. In a television receiver having means for receiving a transmitted signal, a picture tube having a viewing face and first and second input electrodes including a cathode electrode, means for automatically varying picture contrast and brightness comprising: an automatic gain control circuit for maintaining the voltage level of a video signal coupled to an input electrode of said picture tube at a preselected constant level when variations in the intensity of the received signal occur; said automatic gain control circuit including an amplifying device having a control electrode; means for providing a contrast and brightness control voltage which varies in accordance with the intensity of light striking said viewing face; said control voltage means including a light-dependent element positioned relative to said television receiver in a manner for being struck by light of substantially the same intensity as ambient light which strikes the face of said picture tube; said light-dependent element having an electrical characteristic which is proportional to the intensity of light striking the element; means direct-current coupling said control voltage to said cathode of said picture tube for varying the brightness thereof; and means connecting said control voltage to said control electrode of said amplifying device in said automatic gain control circuit.

2. The apparatus of claim 1 wherein said element has a light intensity-resistance characteristic and impedance means are provided and coupled in parallel with said element for attenuating variations in said control voltage when variations in said light intensity-resistance characteristic occur.

3. In a television receiver having means for receiving a transmitted signal, a picture tube having a viewing face and first and second input electrodes including a cathode electrode, means for automatically varying picture contrast and brightness comprising: a keyed automatic gain control circuit for maintaining the voltage level of a video signal coupled to an input electrode of said picture tube at a preselected constant level when variations in the intensity of a received signal occur, said automatic gain control circuit including an electron discharge amplifying device having a control electrode; a control circuit for providing an automatic contrast and brightness control voltage; said control circuit including a source of potential, a resistive impedance and a photo-conductive element connected in series, said element positioned relative to said television receiver to be struck by light of the same intensity as that which strikes the face of said picture tube and having an electrical characteristic which is proportional to the intensity of light striking the element, and means connecting said source of potential to said series connected impedance and element for providing a control voltage which increases toward a value of more positive direct current potential and decreases toward a value of more negative direct current potential when the intensity of light striking said face of said picture tube decreases and increases respectively; a resistance connecting said control circuit to said cathode of said picture tube for varying the brightness thereof; and a resistance connecting said control circuit to said control electrode of said electron discharge amplifying device in said automatic gain control circuit for varying the contrast thereby.

4. The apparatus of claim 3 wherein said resistive impedance connected in series with said photo-conductive element comprises a potentiometer having a sliding arm, and said resistance connecting said control circuit to said cathode of said picture tube is connected to said sliding arm.

References Cited by the Examiner

UNITED STATES PATENTS 3,027,421 3/62 Heijligers ------------ 178—7.5

FOREIGN PATENTS 1,227,937 3/60 France.
1,233,068 5/60 France.

DAVID G. REDINBAUGH, *Primary Examiner.*

JOHN P. WILDMAN, *Examiner.*